(12) United States Patent
Judas

(10) Patent No.: US 6,701,815 B2
(45) Date of Patent: Mar. 9, 2004

(54) DEVICE FOR POSITIONALLY-ACCURATE ACCOMMODATION OF A SECONDARY MEMBER ON A CARRIER

(75) Inventor: Joël Judas, Unterensingen (DE)

(73) Assignee: ESA Eppinger GmbH, Denkendorf (DE)

( * ) Notice: Subject to any disclaimer, the term of this patent is extended or adjusted under 35 U.S.C. 154(b) by 0 days.

(21) Appl. No.: 10/214,536

(22) Filed: Aug. 8, 2002

(65) Prior Publication Data
US 2003/0029287 A1 Feb. 13, 2003

(30) Foreign Application Priority Data
Aug. 9, 2001 (DE) .......................... 101 39 297

(51) Int. Cl.[7] .......................... B23B 29/00; B23B 29/24
(52) U.S. Cl. .......................................... 82/158; 82/159
(58) Field of Search ........................ 82/1.11, 158, 159; 408/35; 29/35.5, 36, 39, 40

(56) References Cited

U.S. PATENT DOCUMENTS 2,366,050 A * 12/1944 Peterson et al. .............. 82/159
5,921,159 A * 7/1999 Watkins ........................ 82/159
6,286,402 B2 * 9/2001 Crudington et al. ......... 82/1.11

FOREIGN PATENT DOCUMENTS

DE 40 36 558 A1 11/1990
DE 199 40 330 C2 3/2001

* cited by examiner

Primary Examiner—Willmon Fridie, Jr.
(74) Attorney, Agent, or Firm—Emch, Schaffer, Schaub & Porcello Co., L.P.A.

(57) ABSTRACT

A device for positionally-accurate accommodation of at least one secondary member on a carrier, such as a toolholder on a turret disc, comprises of adjustable locating means for positionally-accurate adjustment of the secondary member relative to the carrier. The locating means comprise of a bearing surface (24), which is laterally arranged on the carrier in the vicinity of its seat-engaging surface and which are arranged on a locating member that is adjustable relative to the carrier by means of adjusting means (30). Moreover the secondary member (17) comprises of stopping means, which are similarly allocated to the locating member in the vicinity of its seat-engaging surface (170) and which, when a secondary member is mounted on the seat-engaging surface of the carrier, are held in contact with the stopping face with prestress.

32 Claims, 8 Drawing Sheets

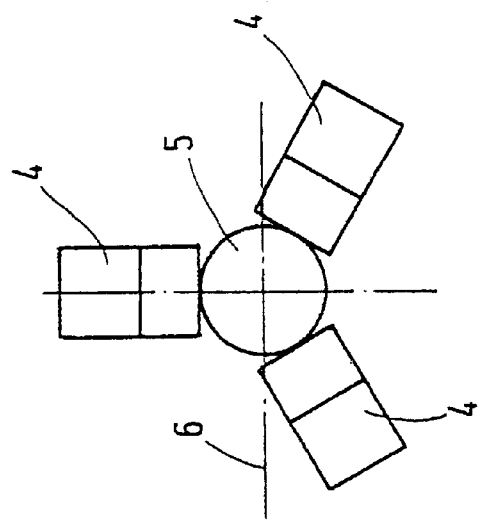
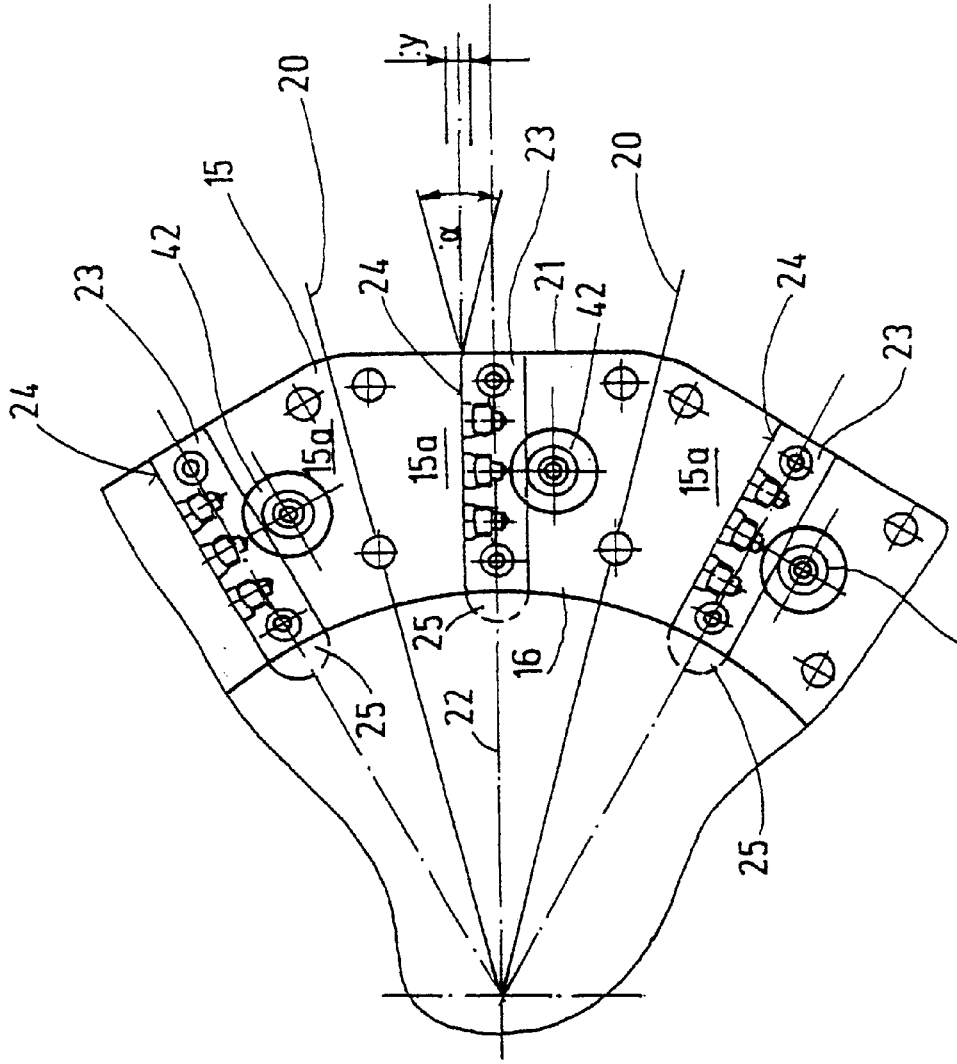

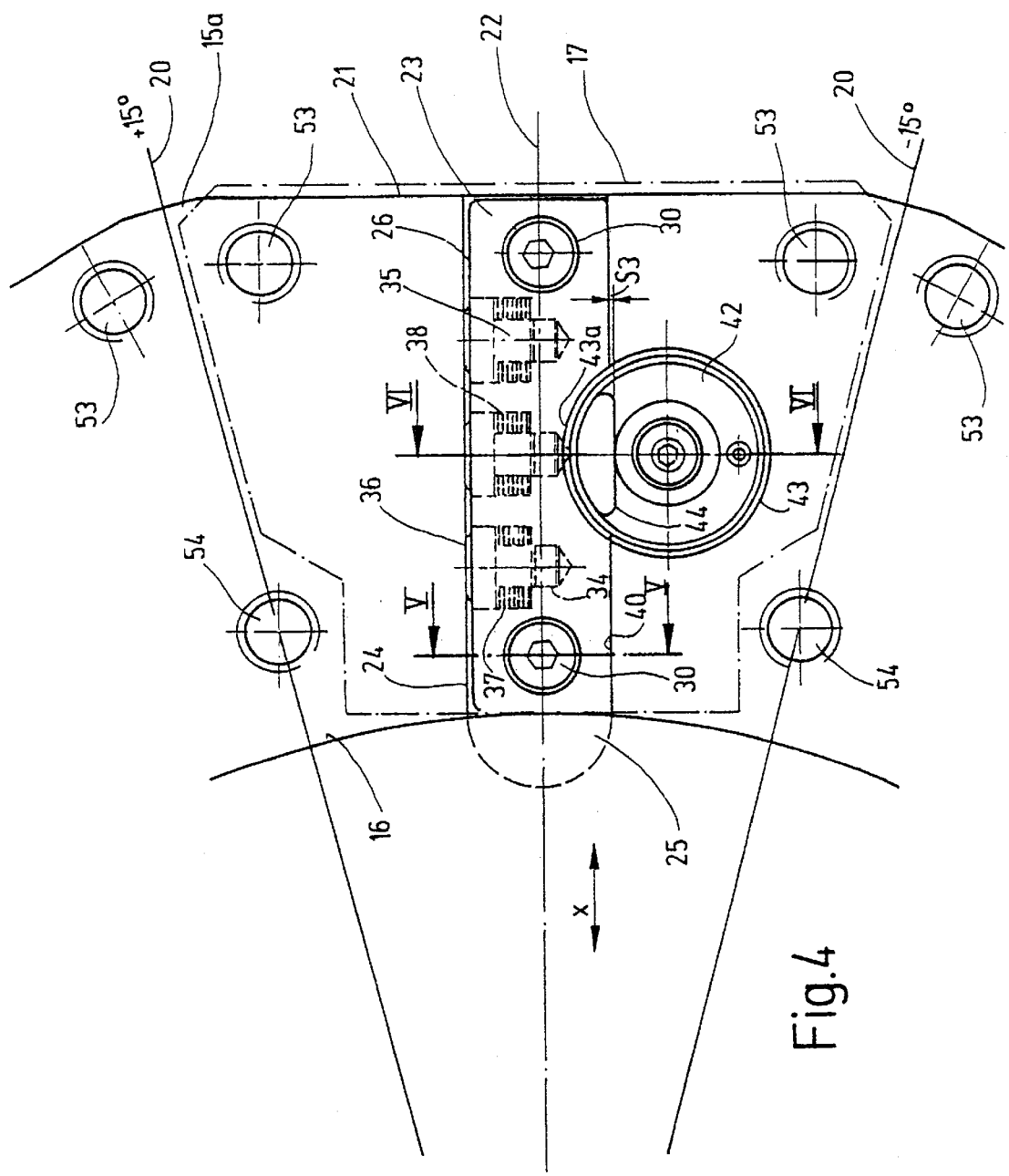

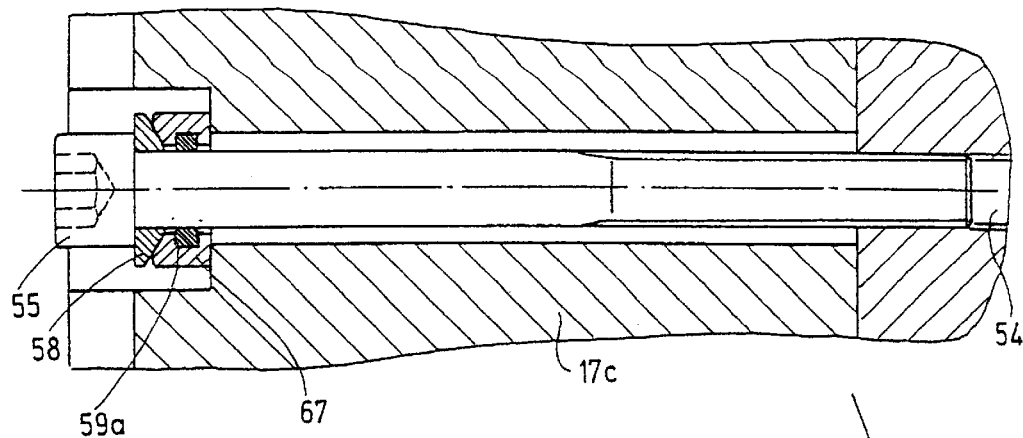
Fig.12
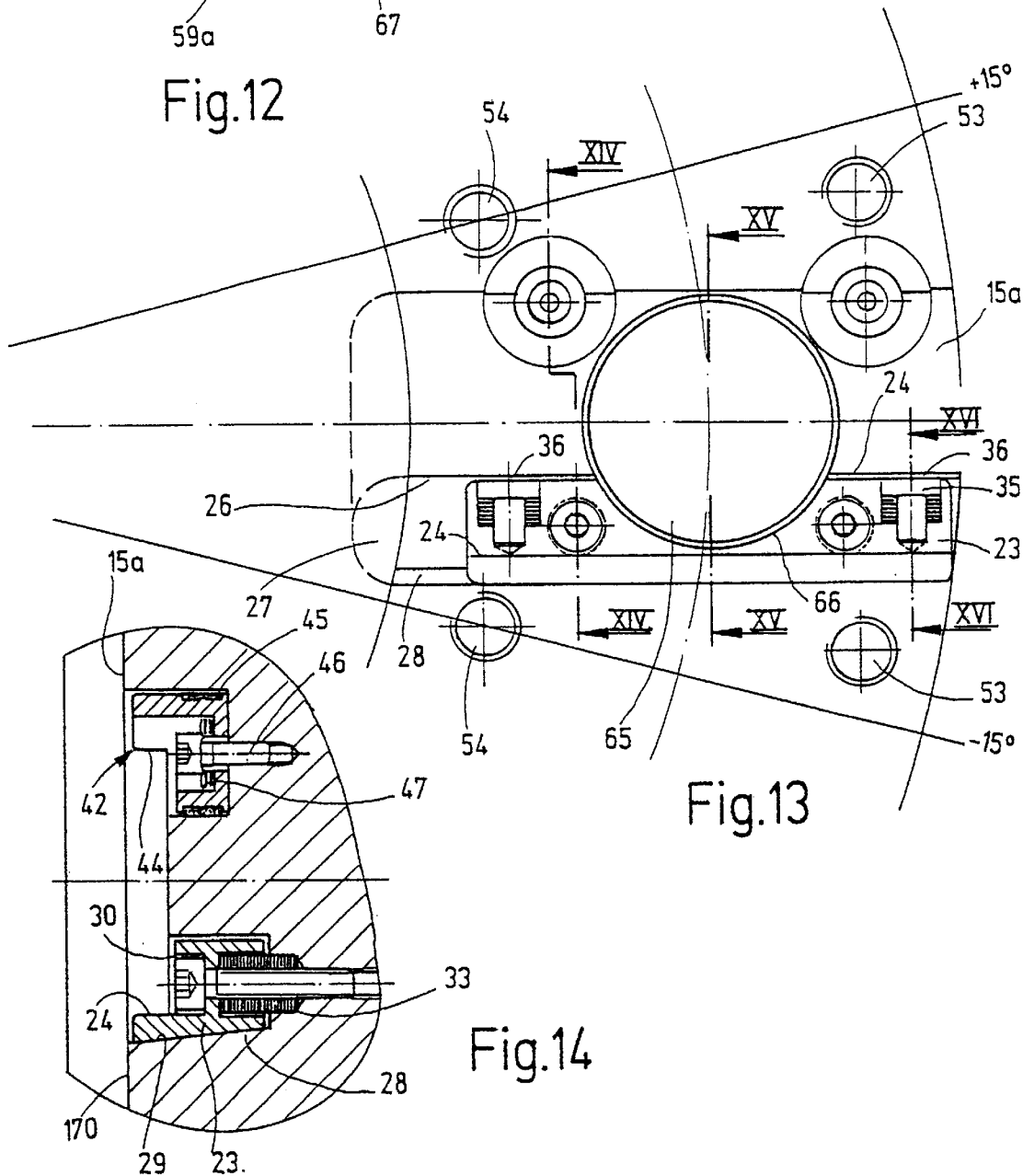
Fig.13
Fig.14

DEVICE FOR POSITIONALLY-ACCURATE ACCOMMODATION OF A SECONDARY MEMBER ON A CARRIER

BACKGROUND OF THE INVENTION

SUMMARY OF THE INVENTION

The invention relates to a device for positionally-accurate accommodation of at least one secondary member on a carrier, the secondary member comprising of a seat-engaging surface.

CNC centers of rotation, for example, frequently operate with tool revolvers that have been fitted with tools, mostly preadjusted, for turning on a lathe, boring, milling, or executing other special functions. The tools are first clamped into toolholders that have been specially matched to the to the tools to be held. The interface between the tool carrier, which generally demonstrates a plurality of stations and is highly switchable from station to station, and the tool carrier arranged within the station in question is called a toolholder receptacle. The need for tool changing frequently arises in practice when manufacturing different kinds of workpieces, automatic tool-changing systems being known for this. To make the tool changing simple and avoid long set-up times, which could be required for example if it were necessary to readjust the toolholder with respect to the tool carrier, tools that have already been preadjusted should be located into the stations of the tool carrier as accurately as possible. This assumes that the toolholder receptacles of the separate stations of the toolholder (e.g. turret disc) align very exactly with the working axes of the tool receptacle. Since manufacturing tolerances in the workpiece carrier are unavoidable, there exists in practice only the option of using suitable adjusting devices to precisely align a station of the tool carrier onto the working axis of the workpiece receptacle. The toolholder receptacles in the other stations of the tool carrier each feature more or less large deviations of position depending on the tolerances of the major parts of the toolholder and their mounting.

To compensate for these deviations of position, it is known for toolholders to demonstrate additional adjusting means that permit balancing of the existing positional tolerances on the toolholder receptacles of those stations of the tool carrier that aren't exactly aligned with the working axes. DE 199 40 330 C2 describes an example of such a toolholder system. These toolholder systems have thoroughly proven themselves in practice, although the adjusting means provided on the toolholder can only be preadjusted in such a manner that they compensate for the deviation of position of a specially allocated toolholder receptacle of the tool carrier. If the preadjusted toolholder were to be inserted into another station of the tool carrier, then the adjustment would have to be changed to compensate for the tolerances present in that station. Expensive readjustments could consequently be required for each tool change, depending on the tool changing system and type of application.

In principle, similar problem definitions also result in so-called zero voltage systems, as used for many different purposes in tools and measuring machines. This involves accommodating, positionally exact in relation to predefined working or measuring axes and in a carrier that could be in the form of a supporting table or slide, clamping devices, measuring devices, calipers, and workpiece holders or toolholders bearing stationary or rotating axes, and in being able to approximately balance existing positional inaccuracies of the carrier within prescribed tolerance limits in an easily reproducible manner. In principle, similar applications arise in attaching handling gear, such as grippers, for robots, automatic handling devices and the like.

It is thus the object of the invention to create a device of the aforementioned type that permits the manufacturing or positional tolerances of a carrier to be balanced in a simple manner, thus making it possible to fit a secondary member, perhaps in the form of a toolholder, onto a carrier, such as a tool carrier, with highly precise and reproducible positional accuracy.

To solve this object, the device according to invention features the characteristics of claim 1.

In this new location device, the locating means demonstrate a bearing surface, which is laterally arranged on the carrier in the vicinity of its seat-engaging surface. Adjusting means arrange this bearing surface on a locating member that is adjustable with respect to the carrier. The secondary member to be accommodated similarly bears stopping means, which are located in the vicinity of its seat-engaging surface, allocated to the locating member, and which, for the secondary member fastened to the seat-engaging surface of the carrier, are held up against the bearing surface with prestress.

In a preferred embodiment, the bearing surface is designed on a locating ledge of the locating means, which is adjustably attached to the carrier.

The basic idea in a location device of this sort, such as in the form of a turret disc for a tool carrier, consists of performing the precise positionally correct alignment and locating of the respective secondary member, such as a toolholder, on an adjustable bearing surface, especially on an adjustable locating ledge of the carrier. For a carrier in the form of a turret disc, the locating ledge, for example, can each time be attached in the center of the station on a annular end face of the turret disc in correspondence with its purpose. This will easily result in a perfectly adjustable stopping face, perhaps in the center of the workpiece receptacle (in the turning center of a CNC center of rotation for example). In this manner, it is ensured that the stopping faces for the toolholder will be aligned with the working axes of the workpiece receptacle on all stations of the tool carrier with great accuracy. No additional adjusting means for adjusting and balancing position errors are required on the toolholders or secondary members themselves in general. They can therefore be finished with high accuracy, the design of the bearing surface on the aforementioned locating ledge leading to very simple structural factors for the toolholder or secondary member, factors that not only ensure the high finishing accuracy desired but that also permit the toolholder to be accommodated on the carrier in manner that greatly saves space, for example. Since, in the design of the new device as a new tool clamping device, the adjustable bearing surface precisely aligns the toolholder receptacles in the individual stations of the tool carrier with the working axes of the workpiece receptacle, the toolholders can also be inserted into the toolholder receptacle of the tool carrier in any desired station that corresponds to the workpiece's purpose without any trouble when changing tools.

Further developments of the new location device are the subject matter of the dependent claims.

BRIEF DESCRIPTION OF THE DRAWINGS

The drawing illustrates exemplary embodiments of the subject matter of the invention. It shows:

FIG. 2: the tool carrier of the lathe depicted in FIG. 1, designed as a turret disc in a view in the direction A of FIG. 1 in cross section and at a different scale, FIG. 3: a basic picture for illustrating the allocation of the workpiece receptacle axis to the locating ledge of a toolholder of the turret disc according to FIG. 2, at another scale, FIG. 4: a toolholder receptacle station of the turret disc according to FIG. 2, with the outline of a toolholder mounted thereon being illustrated by dashed lines, in an appropriately detailed presentation and at a different scale, FIG. 13: the fitting arrangement according to FIG. 4 illustrating an embodiment with a shank boring in the tool carrier and in an appropriate illustration in accordance with FIG. 4, and FIGS. 14 through 16: the fitting arrangement according to FIG. 13, cut along the lines XIV—XIV and XV—XV and XVI—XVI respectively of the fitting arrangement according to FIG. 13, each in cross section and at a different scale.

DETAILED DESCRIPTION OF THE PREFERRED EMBODIMENTS

Figure 1:
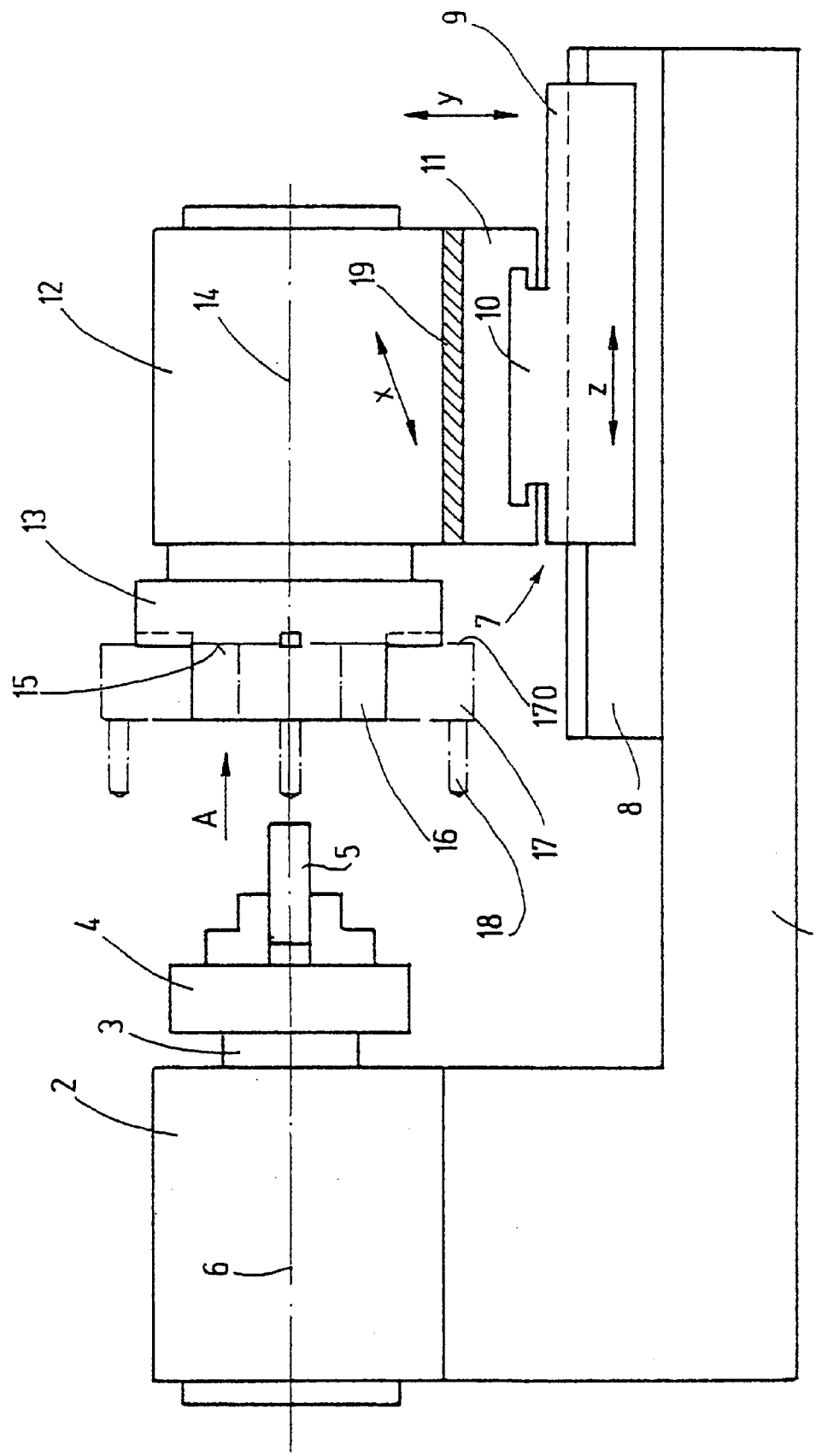
FIG. 1: a lathe with location devices in the form of tool clamping devices in accordance with the invention in schematic illustration and in a side view.

The lathe that is schematically illustrated in a side view in FIG. 1 demonstrates a bed 1, upon which a spindle head 2 is attached. A spindle 3, which bears a three-jaw chuck 4, is rotatably mounted within the spindle head 2. The three-jaw chuck 4 forms a workpiece receptacle and a workpiece 5 is clamped within it. The workpiece 5 rotates around the workpiece receptacle axis indicated by 6.

A cross support 7, which demonstrates a longitudinal guide 8 fastened on the bed 1, is arranged on the bed opposite headstock 2 at a distance. A saddle slide 9, which moves along the Z axis guided on the longitudinal guide 8, bears a lateral guide 10, which guides a cross slide rest 11 that movably slides along the X axis. The cross slide rest 11 carries a turret head 12 with a turret disc 13 that forms a tool carrier and is mounted to rotate around an axis 14 from station to station. When a workpiece is machined, turret disc 13 can be arrested at a predefined angle of rotation relative to turret head 12 in a known manner. Turret disc 13 demonstrates an end face 15 facing the spindle head 2 and is designed with a cylindrical surface 16, which surface internally attaches itself to the end face 15 and is coaxial with the tool carrier axis 14. The end face 15 is annular and forms the seat-engaging surface for toolholders labeled 17, which are mounted in the separate stations on end face 15 and which are connected to the surface plate 13 by fasteners as will be described in detail later. Each of the toolholders 17 is equipped to accommodate a tool indicated by 18, which can be stationary or driven.

A distance plate 19 is located between the cross slide rest 11 and turret head 12, which distance plate, when properly fit, makes it possible to correctly angularly align end face 15 with the axis 6 of the workpiece receptacle formed by the three-jaw chuck 4, and to adjust, in the direction of the X axis, the height in relation to axis 14 of turret disc 13 that forms the tool carrier.

The end face 15 runs perfectly perpendicular to the workpiece receptacle axis 6.

FIG. 2 depicts a cross-sectional view of the turret disc 13 of FIG. 1 in the direction of arrow A of FIG. 1. The basically annular end face 15 is externally bounded by a dashed line, which comprises of twelve work or tool receptacle stations on end face 15, each station taking up a sector with a central angle of 30°. FIGS. 2 and 4 label the (imaginary) boundary lines of a tool receptacle station as 20. The region of end face 15 lying within such a station, in other words the region between adjacent lines 20, forms a sector-shaped flat seat-engaging surface 15a on turret disc 13, which surface is bounded radially outwards by a basically flat surface 21 on the perimeter of the turret disc 13 and inwardly bounded by the cylindrical surface 16, which runs perpendicular to the seat-engaging surface 15a. A toolholder 17, whose basically trapezoidal outline is indicated by a dash-dot line in FIG. 4 and which fits against cylindrical surface 16 radially inwards with lines (theoretically) touching, is mounted on each of the seat-engaging surfaces 15a, the cylindrical surface 16 serving as a radial limit stop. A flat seat-engaging surface 17a (FIGS. 1 and 6), by means of which toolholder 17 fits closely against the respective seat-engaging surface 15a of turret disc 13, is designed on the side of toolholder 17 that faces end face 15.

A longitudinal rectangular locating ledge 23, bounded by parallel lines in the top view, is arranged symmetrically to the center of the given bisecting lines 22 that indicate the tool receptacle station of interest. The locating ledge 23 is shaped block-like and, on one side, bears a precise, flat stopping face 24, which basically passes through above the radial extension of seat-engaging surface 15a. One such locating ledge 23, which is accommodated within a groove 25 in the vicinity of seat-engaging surface 15a, is provided for each tool receptacle station, the groove 25 being symmetrically arranged to line 22, which indicates the center of the tool receptacle station of interest. The groove 25, bounded by a flat surface, comprises of a side wall 26, which runs perpendicular to the seat-engaging surface 15 and faces the bearing surface 24 of the inserted locating ledge 23, a bottom wall 27, which runs parallel to seat-engaging surface 15a, and a side wall 28, which runs diagonally inclined inwards (FIG. 5), of which the diagonal side wall 28 and a slanted surface 29 on the locating ledge 23 together form a wedge gear of such a type that locating ledge 23 and its stopping face 24 move closer to the adjacent grooved side wall 26 when locating edge 23 is pressed into groove 25.

Adjusting means are provided within locating ledge 23, making it possible to readjust the bearing surface 24 (cf.

Figure 5:
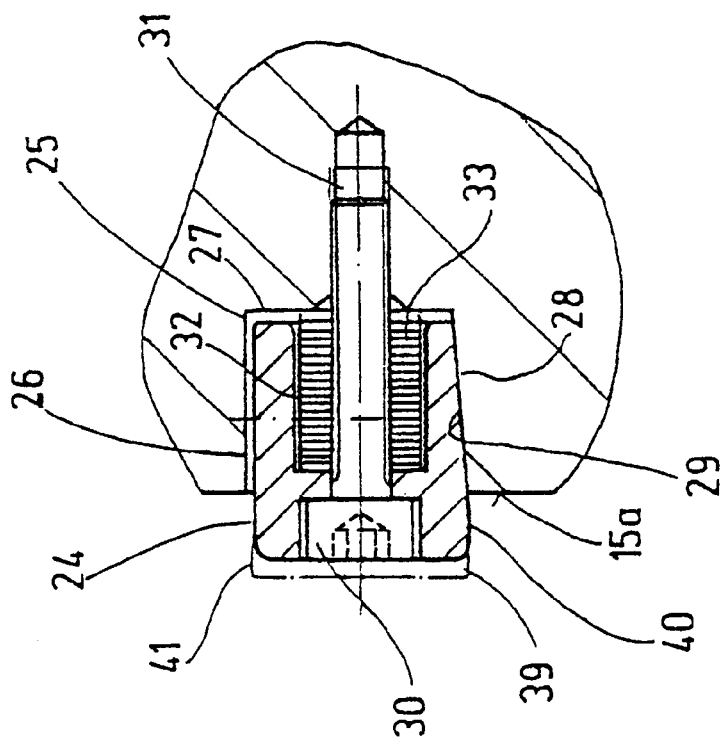
FIG. 5: the fitting arrangement according to FIG. 4, cut along the line V—V of FIG. 4 in a side view and in cross section.

FIG. 5), which projects perpendicularly over seat-engaging surface 15a, relative to workpiece receptacle axis 6 and within the steep region parallel to the workpiece receptacle axis 6 (i.e. center of the headstock) indicated by ±y in FIG. 2 and within an angular area indicated by ±α. The allocation of the position of workpiece receptacle axis 6 is evident from FIG. 3, which is coordinated with FIG. 2. FIG. 3 schematically shows the jaws of the three-jaw chuck 4 of FIG. 1 in side view and in coordination with surface plate 13.

The adjusting means for readjusting the locating ledge 23 demonstrate two adjusting screws 30, which are screwed into two threaded holes 31 (FIG. 5) of turret disc 13, located symmetrical to the centerline 22 of the respective tool receptacle station, and arranged close to the two radial faces of locating ledge 23. One cup-spring assembly 33, which is inserted into a corresponding blind hole 32 of locating ledge 23 and supports locating ledge 23 against the bottom surface 27 of groove 25, is allocated to each adjusting screw 30.

Moreover spring bolts 35, which are equally spaced from each other, their axes being in borings 34 of locating ledge 23 lying in a plane running perpendicular to adjusting screws 30, are displaceably guided, their surface 36 projecting over the bearing surface 24 by a clearance S1, and they abut the facing grooved side wall 26. A cup-spring assembly 37, which is arranged in a corresponding blind hole 38 of locating ledge 23, elastically supports the spring bolts 35, three of which are present for each locating ledge 23 in the exemplary embodiment illustrated in FIG. 4, the blind hole starting out from bearing surface 24.

For the locating ledge 23 inserted into groove 25, the spring bolts 35 with their surfaces 36 thus come into contact with the grooved face 26 under spring bias, so that above them, bearing surface 24 of locating ledge 23 is laterally supported elastically prestressed against turret disc 13.

The adjusting means that have been described work as follows:

If both adjusting screws 30 are tightened equally, the wedge gear formed by the slanted surfaces 28, 29 shifts the locating ledge 23, and consequently its bearing surface 24, parallel to tool receptacle axis 6 against the prestress of cup-spring assembly 37, reducing the clearance S1 (FIG. 6) within the correcting range ±y depicted in FIG. 2. When adjusting screws 30 are loosened, the cup-spring assemblies 33 press the locating ledge 23 out of groove 25, so that gap S1 increases and bearing surface 24 is shifted in the opposite direction within the correcting range ±y.

If on the other hand the two adjusting screws 30 are each tightened to a different extent, then the locating ledge 23 becomes somewhat tipped relative to seat-engaging surface 15a, so that they execute a swinging movement relative to tool receptacle axis 6 within the angular correcting range ±α of FIG. 2 due to the slanted surfaces 28, 29, which cooperate with each other, and their bearing surface 24. When the adjusting screws 30 are loosened unequally, this swinging movement of bearing surface 24 occurs in the opposite direction, caused by the movement of locating ledge 23 generated by the cup-spring assemblies 37, 33.

Figure 6:
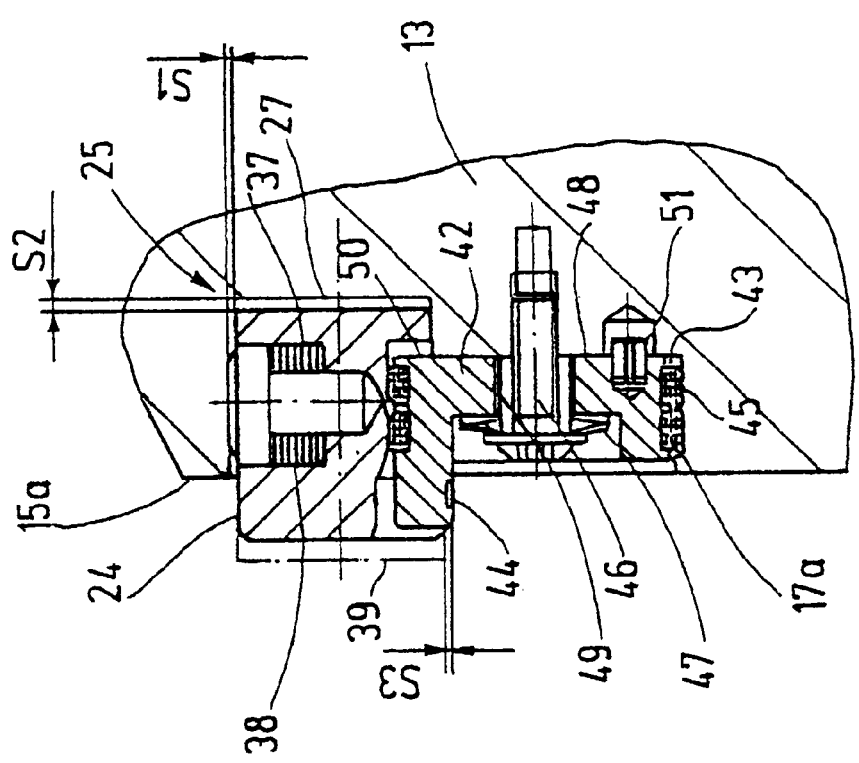
FIG. 6: the fitting arrangement according to FIG. 4, cut along the line VI—VI of FIG. 4 in a side view and in cross section.
Figure 7:
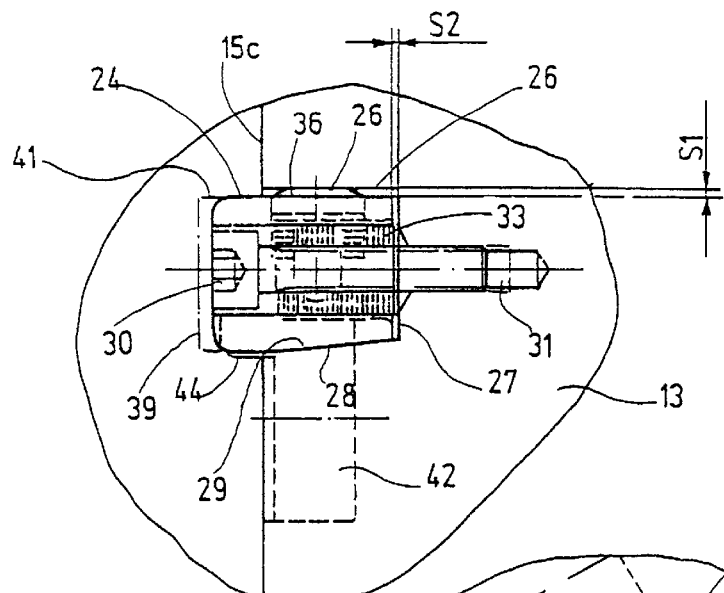
FIG. 7: the fitting arrangement according to FIG. 4, in a front view of a locating ledge of the turret disc, in cross section.

The adjusting screws 30 accordingly permit the bearing surface 24 in each tool receptacle station, which bearing surface projects perpendicularly over the seat-engaging surface 15a, to be exactly aligned in relation to tool receptacle axis 6, both in angle and in position, the gap S2 (FIG. 6) present between locating ledge 23 and respective groove bottom 27 together with the lateral gap S1 of FIG. 6, which has already been mentioned, determining the limits of the correcting ranges ±y and ±α depicted in FIG. 2. Due to these correcting ranges, groove 25 bears a cross section larger than the cross-sectional area of locating ledge 23, which dips into the groove during operation.

For every toolholder 17 that is mounted, bearing surface 24, which projects above the seat-engaging surface 15a of turret disc 13 in every tool receptacle station, forms the base that the toolholder fits against and against which the position of the toolholder is perfectly aligned relative to the workpiece receptacle axis 6 (FIGS. 2, 3). For this purpose, each toolholder 17 is designed with a groove 39 located in the vicinity of its flat seat-engaging surface 17a and indicated with dashed line 39 in FIGS. 5 and 6. The groove 39 is bounded by parallel edges, demonstrates a rectangular cross section and open edges, and its width corresponds approximately to the width of locating ledge 23 in the vicinity of bearing surface 24 and of parallel surface 40 opposite therefrom, surface 40 similarly projecting perpendicularly over seat-engaging surface 15a. Moreover the width of groove 39 is so dimensioned, that the play required to effortlessly mount toolholder 17 onto its respective locating ledge 23 will be present. To facilitate the mounting of toolholder 17 onto locating ledge 23 and to simultaneously ensure that toolholder 17, including its grooved side wall 41 (FIG. 5) facing bearing surface 24 of locating ledge 23, will fit against this bearing surface 24, which determines the precise positionally correct orientation of toolholder 17, free of play and under prestress, there are provided pressure means which, in the embodiment depicted in FIGS. 2 and 4, engage between the two adjusting screws 30 on the side located opposite bearing surface 24, in other words in the vicinity of surface 40 on the allocated side wall of groove 39 of toolholder 17.

These pressure means demonstrate a basically cylindrical thrust piece 42, which is inserted with radial play into a pitch cylinder boring 43 (FIG. 6) of turret disc 13 in the vicinity of its seat-engaging surface 15a. The thrust piece 42 projects laterally into a likewise pitch cylindrical recess 43 in the vicinity of surface 40 of locating ledge 23, as can be seen in FIG. 4. The thrust piece 42, which is somewhat pot-shaped in the longitudinal section VI—VI (FIGS. 4, 6), is designed with a flat thrust face 44 on its interior at a circular segment. When the toolholder 17 is not mounted, the thrust face 44 projects above the adjacent surface 40 of locating ledge 23 by a clearance S3 (FIGS. 4, 6). Two radially projecting O-rings 45, made of an elastic material, are placed on the externally cylindrical thrust piece 42, where they radially support themselves against the adjacent wall sections of boring 43 of turret disc 13 and of the pitch cylindrical recess 43a of locating ledge 23 and where they elastically locate thrust piece 42 into a mean position in which its thrust face 44 projects over the surface 40 by the clearance S3.

A screw bolt 46 and a cup-spring assembly 47 prestress the thrust piece 42 against the flat bottom surface 48 of the boring 43, a distance sleeve 49 determining the maximum size of this prestress and the thrust piece finding space in correspondence with its external form, partially in locating ledge 23 and partially in turret disc 13. The distance sleeve 49 runs through a diameter of thrust piece 42 larger than boring 50, so that this thrust piece, and consequently its thrust face 44, are shifted laterally relative to the locating ledge 23 to a limited extent. An index bolt 51, which engages a corresponding boring of turret disc 13, prevents thrust piece 42 from rotating around the axis of screw bolt 46. Due to the prestress produced by the cup springs 47, the motion of thrust piece 42 restrained to only move along the surface 48.

The prestress from cup-spring assembly 47 that presses thrust piece 42 against surface 48 and whose size is restricted by distance sleeve 49, is chosen so that the restoring forces of O-rings 45 are greater than the frictional forces occurring on the surface when the thrust piece changes its position by more than ±0.02 mm relative to the clearance that O-rings fit against. When a toolholder 17 is inserted into the respective tool receptacle station, which is in horizontal alignment with locating ledge 23 of the toolholder, the toolholder together with side wall 41 of its groove 39 are pushed onto the bearing surface 24 of locating ledge 23 (FIG. 5). Thrust face 44 is thereby pressed inward by approximately 0.3 mm due to its contact with the corresponding side wall of groove 39, resulting in the fact that toolholder 17, together with its grooved side wall 41, aligns itself to bearing surface 24 of locating ledge 23 with a force generated by O-rings 45, which are pressed together, which force is larger than the weight engaging toolholder 17. Thrust piece 42, which is moveable in this way, simultaneously permits toolholder 17 to be easily mounted on locating ledge 23. The prestress, which presses slanted surface 28 against slanted surface 29 of groove 27 in turret disc 13, is equal to a multiple of all the forces that occur when toolholder 17 is mounted on and aligned with locating ledge 23, so that the position of locating ledge 23, which had been set by adjusting screws 30, remains unchanged to turret disc 13. The adjustment of locating ledge 23, which has already been explained, makes it possible to balance, in each tool receptacle station, the manufacturing tolerances of the turret disc and its mounting, which are at most 0.02 mm depending on the size of the turret disc. In the embodiment illustrated in FIGS. 2 and 4 as an example, the clearance S1 can be changed about ±0.02 mm at most and the clearance S2 to about ±0.2 mm at most to balance these tolerances when the locating ledge is adjusted, the function of thrust piece 42 not being significantly affected thereby.

Toolholder 17, whose outline is indicated in dash-dot lines in FIG. 4, is fastened into its respective tool receptacle station, especially in the manner evident from FIGS. 8, 10, 11, and 13. Four fastening screws serve this function in the chosen exemplary embodiment, of which two fastening screws 52 screw into corresponding tapped holes 53 within the sector region defined by the two boundary lines 20, while the tapped holes 54 of the two other fastening screws 55 and their axes lie on the two lines 20. This accomplishes that the fastening screws 55 press each pair of adjacent toolholders 17, 17a–c, against seat-engaging surface 15a simultaneously. This saves considerable space in the tapering sector-shaped area of the tool receptacle station, making it possible to accommodate additional parts and members of the toolholder and their drives within the region that is tapering gusset-like. This is evident from FIGS. 8 and 10 for example, which respectively illustrate embodiments 17a and 17b of a toolholder 17, which embodiments demonstrate a radial location shank 56, which is inserted into a corresponding radial location hole 57 of turret disc 13. The diameter of location hole 57 is larger than that of the shank 56, so that there is enough radial play that locating ledge 23 can ensure the depicted orientation and precisely adjust the position of toolholder 17a or 17b, respectively.

Figure 9:
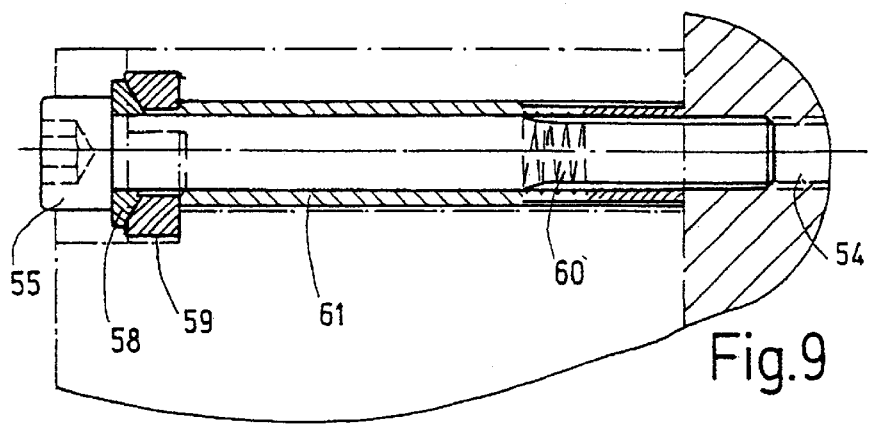
FIG. 9: the fitting arrangement according to FIG. 8, cut along the line IX—IX of FIG. 8 in a side view in cross section and at a different scale.

FIG. 9 depicts details regarding the common fastening of adjacent toolholders 17a: By means of an externally spherical thrust washer 58, the screw bolt 55 supports itself on an appropriately shaped thrust piece 59, which bridges the gap between two adjacent toolholders 17a. A sleeve 61, subjected to the prestress of a slip-on spring 60, ensures that thrust piece 59 will be automatically raised and shifted outwards when fastening screw 55 is loosened.

Figure 8:
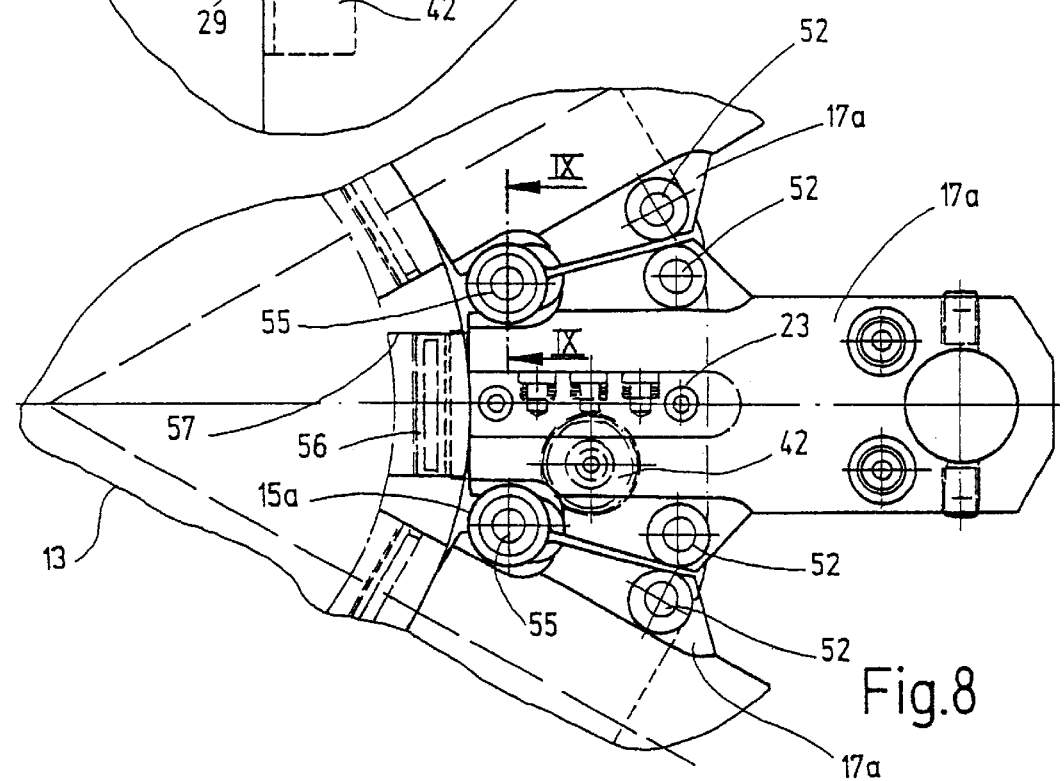
FIG. 8: the fitting arrangement according to FIG. 4, equipped with toolholders, in top view and in cross section and at a different scale.
Figure 10:
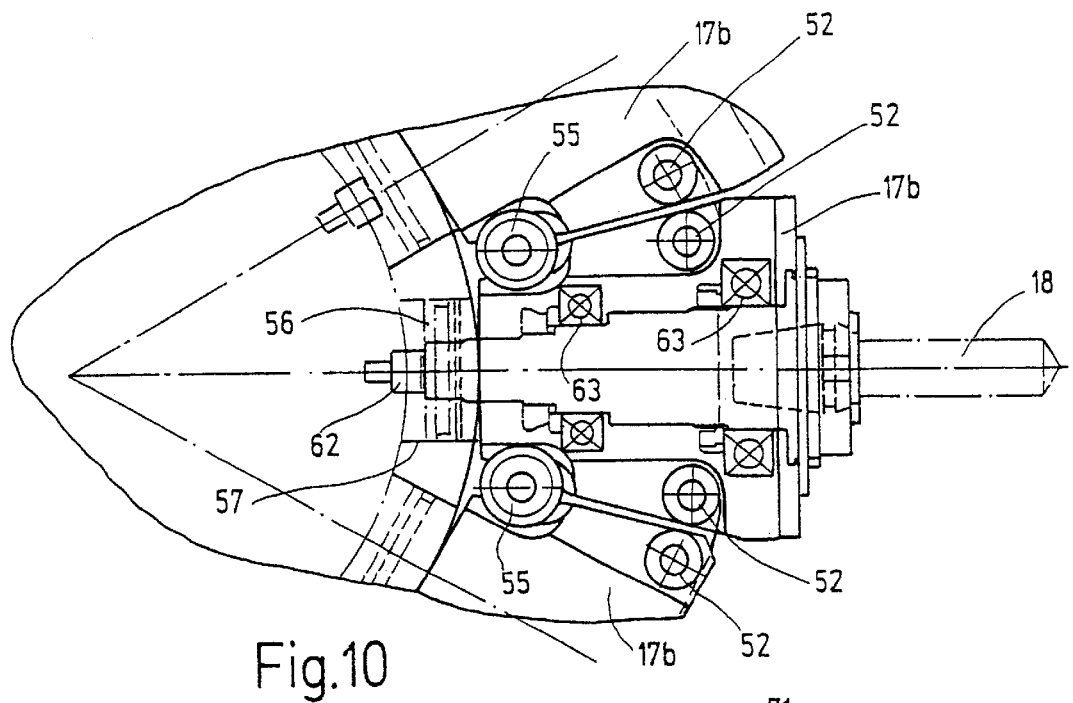
FIG. 10: the fitting arrangement according to FIG. 4, equipped with toolholders with driven tools in top view and in an illustration corresponding to FIG. 8, FIG. 11: the fitting arrangement according to FIG. 4, equipped with a different embodiment of toolholders, each demonstrating one shank, in an illustration corresponding to FIG. 8, FIG. 12: the fitting arrangement according to FIG. 11, cut along the line XII—XII of FIG. 11 in a side view in cross section and at a different scale.

Variant 17b of toolholder 17, which is illustrated in FIG. 10, differs from that of FIG. 8 only in that toolholder 17b bears a driven tool 18, whose drive 62 is similarly located in the gusset-shaped space behind the shank 56 of toolholder 17b. The mounting for the spindle of the toolholder, which spindle carries the tool 18, is labeled 63.

In embodiment 17c of toolholder 17, which is illustrated in FIGS. 11 through 16, toolholder 17c is provided with a projecting, cylindrical, pin-like shank 64 in the vicinity of its seat-engaging surface 170, the shank 64 being accommodated in a cylindrical location hole 65 of turret disc 13, which location hole is arranged in the vicinity of the respective seat-engaging surface 15a of turret disc 13. The shank 64 lies in the location hole 65, which touches the edge with so much radial play that the locating ledge 23 does not impede the orientation and precise positional adjustment of toolholder 17c. As FIG. 13 shows, the locating ledge 23, which only contains two spring plates 35, is designed with a pitch cylindrical recess 66 so that bearing surface 24 is obstructed along its length. Here the locating ledge 23 lies off-center to the tool receptacle station, while the two thrust pieces 42 are provided at a distance from locating ledge 23, as is evident in FIG. 13.

Support for the common fastening screws 55 for two toolholders 17c, 17d, which can be seen in FIG. 12, is solved somewhat differently than for the embodiment depicted in FIG. 9. Thrust piece 59a is equipped with an inlaid elastic ring 67, which makes thrust piece 59a self-locating. The spring 60 and sleeve 61 depicted in FIG. 9 are omitted in this case.

Figure 11:
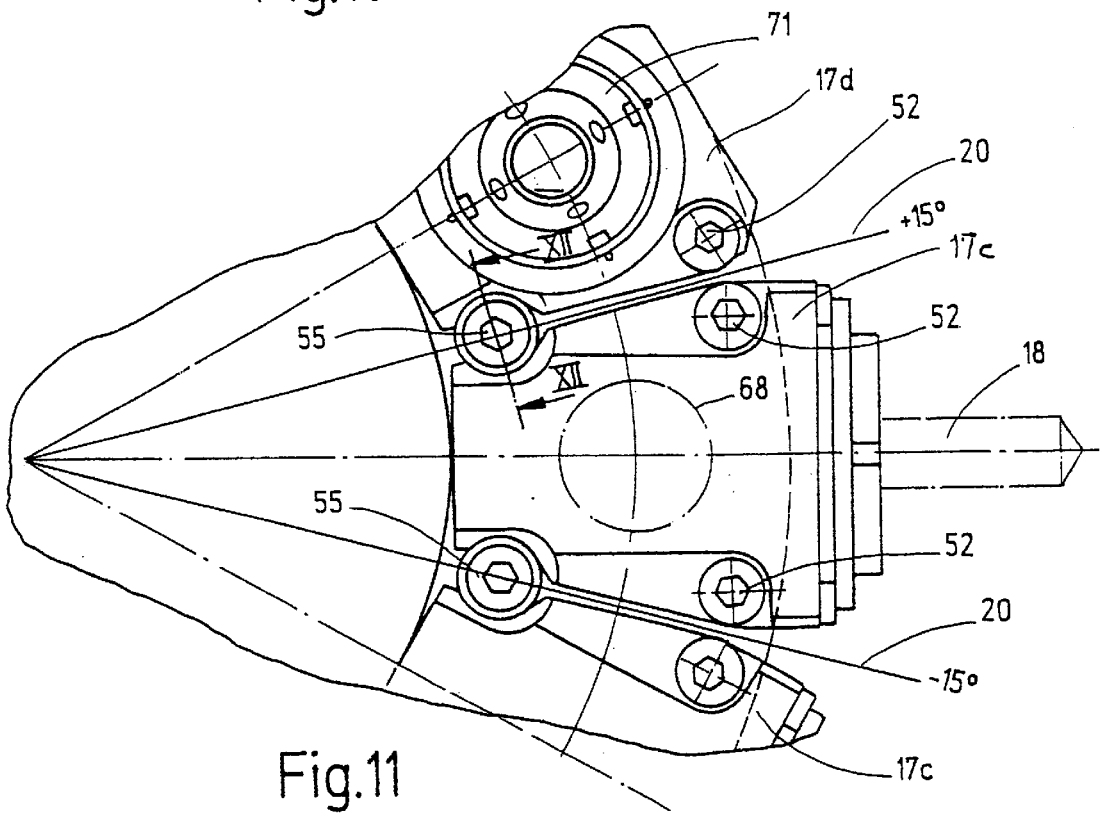

The toolholder 17c can be designed to accommodate stationary or rotating tools 18. In the latter case, the drive shaft runs through shank 64, as indicated by dashed line 68 in FIG. 11. Whereas for toolholder 17c the axis of the tool 18 runs radial to turret disc 13, additional toolholders can be arranged on the turret disc, or solely toolholders whose tool axis is perpendicular to end face 15 (FIG. 2), i.e. which extend to the seat-engaging surface 15a of the respective tool receptacle station. FIG. 11 shows an example in the form of toolholder 17d. The tool location hole of this toolholder 17d is labeled 70, while its associated clamping sleeve, which bears key noses for tool 16, is visible in top view as 71.

Figure 15:
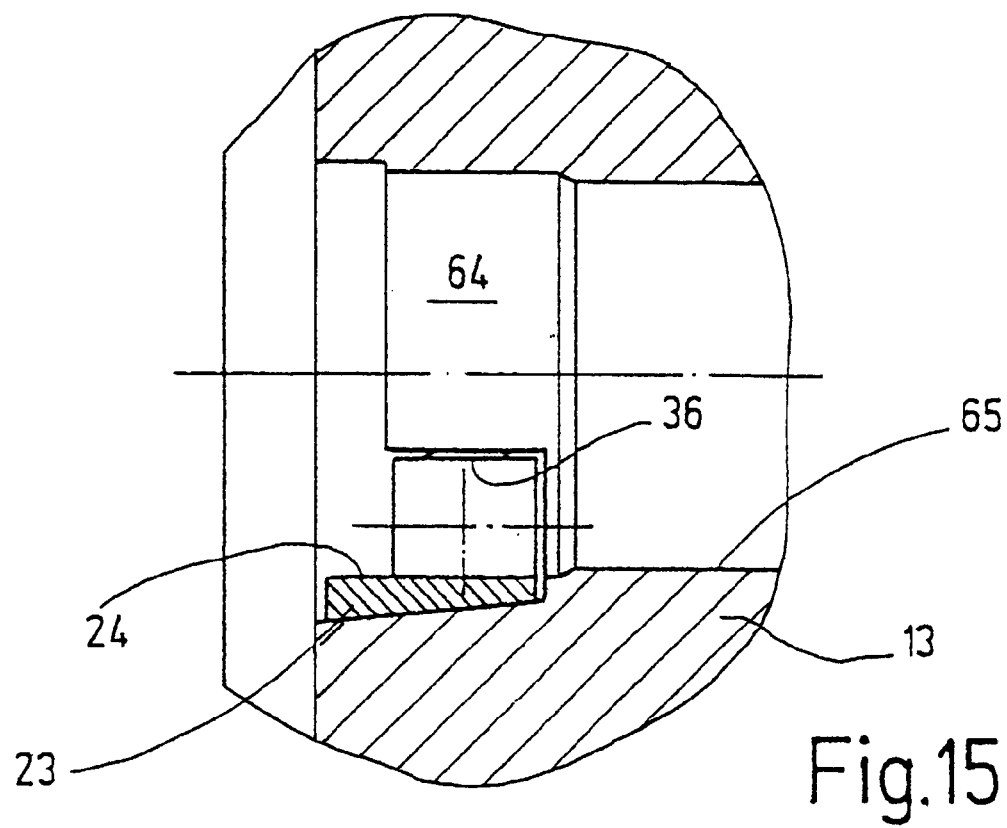
Figure 16:
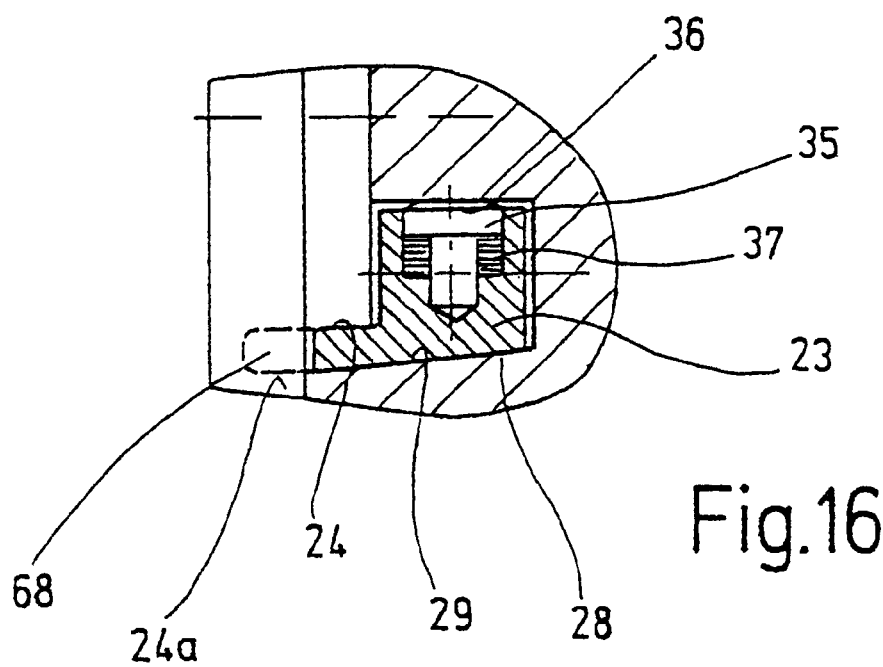

Finally, FIGS. 15 and 16 show sectional drawings of the clamping device according to FIG. 13 in which the locating ledge 23 is located within the outline of the shank 64 indicated in FIG. 15, and is therefore accommodated with particular saving of space. Thrust piece 42 is provided within the outline of shank 64 in a similar manner, resulting in a basically similar fitting arrangement as FIG. 15 indicates. Here it is also conceivable to provide bearing surface 24 of locating ledge 23 in a different place within locating ledge 23, similarly as drawn in FIG. 4, possibly on a nose 68 of the locating ledge 23, the bearing surface now being labeled 24a.

Finally, let us mention that the toolholder 17 does not have to fit against the bearing surface 24, 24a of locating ledge 23 two-dimensionally. Embodiments in which a linear arrangement, as would be possible using two precise locating pins arranged apart from each other, are conceivable.

I claim:

1. Device for positionally-accurate accommodation of at least one secondary member (17) on a carrier (13), said secondary member having an engaging surface, said carrier including a seat-engaging surface (15a), said device comprising (a) an adjustable locating member (23) for adjusting said secondary member (17) relative to said carrier (13), said locating member including a bearing surface (24) laterally arranged on said carrier in the vicinity of said seat-engaging surface, (b) means for adjusting (30) said locating member relative to said carrier, (c) stopping means (41) on said secondary member, said stopping means being positioned in the vicinity of said seat-engaging surface (15*a*) and, (d) means for mounting said secondary member (17) on said seat-engaging surface (15*a*), said stopping means (41) being held in engagement with said bearing surface (24) under prestress.

2. Device for positionally-accurate accommodation of at least one secondary member (17) on a carrier (13), said secondary member having an engaging surface, said carrier including a seat-engaging surface (15*a*), said device comprising (a) an adjustable locating member (23) for adjusting said secondary member (17) relative to said carrier (13), said locating member including a bearing surface (24), said bearing surface projecting over said seat-engaging surface, (15*a*) (b) means for adjusting (30) said locating member relative to said carrier, (c) stopping means (41) on said secondary member, said stopping means being positioned in the vicinity of said seat-engaging surface (15*a*) and, (d) means for mounting said secondary member (17) on said seat-engaging surface (15*a*), said stopping means (41) being held in engagement with said bearing surface (24) under prestress.

3. Device for positionally-accurate accommodation of at least one secondary member (17) on a carrier (13), said secondary member having an engaging surface, said carrier including a seat-engaging surface (15*a*), said device comprising (a) an adjustable locating member (23) for adjusting said secondary member (17) relative to said carrier (13), said locating member including a bearing surface (24) laterally arranged on said carrier in the vicinity of and recessed from said seat-engaging surface, (b) means for adjusting (30) said locating member relative to said carrier, (c) stopping means (41) on said secondary member, said stopping means being positioned in the vicinity of said seat-engaging surface 15*a*, and (d) means for mounting said secondary member on said seat-engaging surface (15*a*), said stopping means (41) being held in engagement with said bearing surface under prestress.

4. Device according to claim 1, characterized in that said locating member (23) is adjustably attached to said carrier (13).

5. Device according to claim 1, characterized in that said bearing surface (24) includes of at least one recess (66).

6. Device according to claim 4, characterized in that said locating member (23) is positioned in a recess (25) on said carrier (13), the width of said recess being greater than the width of said locating member and further including adjusting means on said locating member.

7. Device according to claim 6, characterized in that said locating member (23) is resiliently supported against a wall (26) of said recess (25).

8. Device according to claim 7, characterized in that said adjusting means comprise a wedge drive (28, 29) with which the position of said locating member (23) can be adjusted relative to said carrier (13) in at least one coordinate direction.

9. Device according to claim 6, characterized in that said adjusting means comprise of at least two spaced apart adjusting screws (30), and further including spring means (33) for resiliently supporting said locating member (23) on said carrier (13).

10. Device according to claim 1, characterized in that said carrier (13) has mounted thereon flexible pressure means (42) urging said secondary member (17) against said bearing surface (24).

11. Device according to claim 10, characterized in that said pressure means comprise of at least one thrust piece (42), which is spring-elastically supported crosswise to said bearing surface (24) and which is mounted with limited mobility on said carrier (13) at a distance opposite and crosswise to said bearing surface (24).

12. Device according to claim 11, characterized in that said thrust piece (42) is mounted on said carrier 13 with restrained frictional engagement.

13. Device according to claim 12, characterized in that said thrust piece (42) is pressed against a seat-engaging surface (46) of said tool carrier under prestress.

14. Device according to claim 2, characterized in that said stopping means of said secondary member comprise of a groove (39) in the vicinity of its seat-engaging surface (17*a*).

15. Device according to claim 3, characterized in that said stopping means (41) is engaged by a pin projecting above said seat-engaging surface (17*a*) of said secondary member.

16. Device according to claim 1, characterized in that said secondary member is supported against a solid limit stop (16) on said carrier in the longitudinal direction of said bearing surface (24).

17. Device according to claim 1, characterized in that said carrier is a tool carrier (13) and that at least one secondary member is a toolholder.

18. Device according to claim 17, characterized in that said tool carrier (13) has an annular shape with said seat-engaging surface sized to receive a plurality of toolholders (17), said toolholders being sector-shaped in the vicinity of their seat-engaging surface (17*a*).

19. Device according to claim 17, characterized in that loosenable fixtures, each of which comprises of one common fastener (58, 59, 67) for two adjacent toolholders, fasten said toolholders (17) to said tool carrier (13).

20. Device for positioning at least one secondary member on a carrier, said secondary member having an engaging surface adjoining said carrier, said device comprising:
  (a) a recess in said carrier, said recess having a first sidewall, a bottom wall and a second sidewall tapering toward said first sidewall in a direction extending toward said endwall;
  (b) an adjustable locating member for positioning said secondary member relative to said carrier, said locating member being positioned in said recess and having a bearing surface spaced from said first sidewall and a slanted surface engaged to said second sidewall;
  (c) an adjusting means engaging said locating member to said carrier in said recess, said adjusting means movable to move said locating member including said slanted surface relative to said second sidewall, such movement varying the space between said bearing surface and said first sidewall; and
  (d) said secondary member including a stopping face adjacent said locating member which, when said secondary member is mounted on said carrier is held in contact with said carrier with prestress.

21. Device according to claim 20, characterized in that said bearing surface of said locating member projects outwardly from said engaging surface of said carrier.

22. Device according to claim 20, characterized in that said bearing surface of said locating member is recessed compared to said engaging surface of said carrier and said secondary member comprises stopping means that project compared to its engaging surface.

23. Device according to claim 20, characterized in that said locating member bearing surface is supported elastically flexible in said recess against said first sidewall.

24. Device according to claim 23, characterized in that said adjusting means comprise a wedge drive with which the position of said locating member can be adjusted relative to said carrier in at least one coordinate direction.

25. Device according to claim 20, characterized in that said adjusting means comprise at least two spaced apart adjusting screws which penetrate said locating member and in whose vicinity spring means are arranged, by means of which said locating member is supported elastically flexible against said carrier in the axial direction of said adjusting screws.

26. Device according to claim 25, characterized in that said carrier includes a flexible pressure means which, for a secondary member mounted on said carrier, holds it free of play against said bearing surface.

27. Device according to claim 26, characterized in that said pressure means comprises at least one thrust piece, which is spring-elastically supported crosswise to said bearing surface and which is mounted with limited mobility on said carrier.

28. Device according to claim 27, characterized in that said thrust piece is mounted on said carrier with restrained frictional engagement.

29. Device according to claim 28, characterized in that said thrust piece is pressed against an engaging surface of said carrier under prestress.

30. Device according to claim 21, characterized in that said stopping means of said secondary member comprise of a groove in the vicinity of said engaging surface.

31. Device according to claim 22, characterized in that said stopping means includes a pin projecting above said engaging surface of said secondary member.

32. Device according to claim 20, characterized in that said secondary member is supported against a solid limit stop on said carrier in the longitudinal direction of said bearing surface.

* * * * *